(12) United States Patent
Vaes et al.

(10) Patent No.: US 8,915,620 B2
(45) Date of Patent: Dec. 23, 2014

(54) ILLUMINATION SYSTEM FOR USE IN A STEREOLITHOGRAPHY APPARATUS

(75) Inventors: Mark Herman Else Vaes, Eindhoven (NL); Herman Hendrikus Maalderink, Nuenen (NL); Adrianus Johannes Petrus Maria Vermeer, Geldrop (NL); Jacobus Hubertus Theodoor Jamar, Vessem (NL); Antonius Hubertus Joannes Gerardus Lommen, Grubbenvorst (NL); Andries Rijfers, Kamerik (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 13/146,858

(22) PCT Filed: Jan. 29, 2010

(86) PCT No.: PCT/NL2010/050043
§ 371 (c)(1),
(2), (4) Date: Oct. 6, 2011

(87) PCT Pub. No.: WO2010/087708
PCT Pub. Date: Aug. 5, 2010

(65) Prior Publication Data
US 2012/0106150 A1 May 3, 2012

(30) Foreign Application Priority Data

Jan. 30, 2009 (EP) .................................... 09151794

(51) Int. Cl.
*F21V 3/00* (2006.01)
*F21V 5/00* (2006.01)
(Continued)

(52) U.S. Cl.
CPC .............. *B29C 67/007* (2013.01); *Y10S 362/80* (2013.01)
USPC ................. 362/311.02; 362/249.02; 362/294; 362/236; 362/268; 362/800; 257/99

(58) Field of Classification Search
USPC .......... 362/217.01–217.17, 235, 236, 249.02, 362/276, 311.02, 545, 555, 612, 800, 294; 438/22–47, 69, 493, 503, 507, 956; 257/13, 79–103, 918, 257/E51.018–E51.022, E33.001–E33.077, 257/E33.054, E25.028, E25.032; 347/238
See application file for complete search history.

(56) References Cited

U.S. PATENT DOCUMENTS 4,942,405 A 7/1990 Dody et al.
5,173,759 A * 12/1992 Murano .......................... 257/88
(Continued)

FOREIGN PATENT DOCUMENTS

EP 0 958 912 11/1999
JP 63-6853 1/1988
(Continued)

OTHER PUBLICATIONS

Ogihara, Mitsuhiko, "Latest Trend of High Definition LED Printheads", Oki Technical Review, Oct. 2006, Issue 208, vol. 73, No. 4, pp. 28-31.

(Continued)

*Primary Examiner* — Peggy Neils
*Assistant Examiner* — William N Harris
(74) *Attorney, Agent, or Firm* — Brinks Gilson & Lione

(57) ABSTRACT

The present invention relates to an illumination system for use in a stereolithography apparatus. The illumination system includes a plurality of light-emitting diodes (LEDs), each LED having at least a first light-emitting surface and a second surface, at least one of the first and the second surface being substantially flat. The illumination further includes a plurality of electrical pathways, selectively connected to the respective LEDs, such that each LED can be individually controlled and a leveling surface. The leveling surface is substantially flat and in leveling contact with the at least one substantially flat surface of each LED, such that a two-dimensional array of LEDs extends in a plane parallel to the leveling surface.

15 Claims, 5 Drawing Sheets

(51) Int. Cl.
*F21S 4/00* (2006.01)
*F21V 21/00* (2006.01)
*F21V 29/00* (2006.01)
*F21V 1/00* (2006.01)
*F21V 11/00* (2006.01)
*F21S 8/00* (2006.01)
*H01L 33/00* (2010.01)
*B29C 67/00* (2006.01)

(56) References Cited

U.S. PATENT DOCUMENTS

| | | | |
|---|---|---|---|
| 5,311,060 A | | 5/1994 | Rostoker et al. |
| 5,317,344 A | * | 5/1994 | Beaman et al. ............... 347/237 |
| 5,453,145 A | | 9/1995 | Beaman et al. |
| 5,655,189 A | * | 8/1997 | Murano ....................... 399/220 |
| 5,857,767 A | | 1/1999 | Hochstein et al. |
| 6,214,432 B1 | * | 4/2001 | Chullino et al. ............. 428/64.1 |
| 2005/0057641 A1 | * | 3/2005 | Ogihara et al. ............... 347/238 |
| 2008/0038396 A1 | * | 2/2008 | John et al. ................... 425/174.4 |
| 2009/0115833 A1 | * | 5/2009 | Soulliaert et al. ............. 347/238 |
| 2010/0092214 A1 | | 4/2010 | Itou |

FOREIGN PATENT DOCUMENTS

| | | |
|---|---|---|
| JP | 04062998 | 2/1992 |
| JP | 05323230 | 12/1993 |
| JP | 11-138645 | 5/1999 |
| JP | 2001063142 | 3/2001 |
| JP | 2007273972 | 10/2007 |
| WO | WO 2004/009318 | 1/2004 |
| WO | WO 2006095949 A1 * | 9/2006 |
| WO | WO 2008/081846 | 7/2008 |

OTHER PUBLICATIONS

International Search Report, PCT/NL2010/050043.
International Preliminary Report on Patentability, PCT/NL2010/050043.

* cited by examiner

ILLUMINATION SYSTEM FOR USE IN A STEREOLITHOGRAPHY APPARATUS

The invention relates to the field of stereolithography, and more in particular to an illumination system for use in a stereolithography apparatus.

Stereolithography, also known as 3D-printing, is a rapid prototyping technology for producing parts with high accuracy. In a simple implementation stereolithography may utilize a vat of liquid light-curable photopolymer resin and a computer controlled UV-laser to cure the resin, one layer at a time. The construction process is essentially cyclic. For each layer that corresponds to a slice of the part to be produced, the spot of the laser beam traces the respective cross-sectional pattern on the surface of the liquid resin. Exposure to the laser light cures or solidifies the traced pattern, and adheres it to the layer below. Once a layer has been cured, the part in the making—which may rest on an elevator platform immersed in the vat of photopolymer resin—may be lowered by a single layer thickness such that its top layer is positioned just below the surface of the resin again, allowing the next layer to be built. This sequence of steps is continued until the part is finished.

Instead of with a laser, the stereolithography apparatus may be fitted with an illumination system comprising two-dimensional arrays of LEDs and lenses to provide for selective illumination of the photopolymer resin. The illumination system as a whole may be moveably disposed relative to the location of the workpiece, while the LEDs may be rigidly connected to one another and the lenses. The lenses may serve to image the light-emitting surfaces of the LEDs onto the surface of the photopolymer resin. Preferably, each LED is associated with its own conjugate image spot, such that an array comprising a certain number of LEDs may produce just as many image spots. During production, the illumination system may be scanningly moved relative to the vat holding the photopolymer resin, while the individual LEDs may be selectively switched on and off so as to illuminate the surface of the resin according to the cross-sectional pattern of the layer to be solidified. Compared to a laser, an illumination system based on LED lighting is relatively inexpensive. In addition, it offers an equally high accuracy at greater production speeds.

Manufacturing a reliable illumination system in an economical fashion has been found problematic. A primary reason for this, is that an illumination system capable of illuminating a photopolymer resin to high accuracy, so as to allow even very fine details of a workpiece to be fabricated, must be capable of producing sufficiently bright image spots with well defined dimensions at well-defined positions. The requirement of sufficient brightness leads to an optical system with a high numerical aperture, since a higher numerical aperture enables the optical system to collect more light from the LEDs. However, a high numerical aperture may be accompanied by a high sensitivity of the image spot dimensions to the precise LED positions.

It is an object of the present invention to provide for an LED economically manufacturable illumination system, whose design allows it to be used in combination with an optical system having a high numerical aperture.

To this end, the invention provides an illumination system suitable for use in a stereolithography apparatus, comprising: a plurality of light-emitting diodes (LEDs), each LED having at least a first, light-emitting surface and a second surface, at least one of the first and the second surface being substantially flat; a plurality of electrical pathways, selectively connected to the respective LEDs, such that each LED can be individually controlled; and a levelling surface, wherein the levelling surface is substantially flat and in levelling contact with the at least one substantially flat surface of each LED, such that a two-dimensional array of LEDs extends in a plane parallel to the levelling surface.

To obtain the desired accuracy in the z-direction, the LEDs are brought into levelling contact with a substantially flat levelling surface. The term 'substantially flat' refers to surfaces having a surface flatness of less than about 10 µm, and preferably less than 5 µm. Such a degree of surface flatness may for example be achieved through optical polishing. The levelling surface may, for example, be provided by a mechanical carrier or support body, or by a multi-lens array, as will be elucidated below. It is noted that a levelling surface may be made up of multiple, separate levelling surfaces that extend in the same plane. The term levelling surface is thus not necessarily to be construed as meaning a single, continuous surface. See for example FIG. 2 and the discussion thereof below.

To obtain a sufficient positional accuracy in the x-y plane, i.e. the plane of the two-dimensional LED array, or to improve the positional accuracy therein, the illumination system according to the invention may be manufactured using diced, but unpackaged LEDs: so-called bare dies. The underlying insight is concerned with the fact that common surface mount LEDs are embedded in an IC-package, which package—when being handled by a pick-and-place robot—serves as a reference. Since the outer dimensions of the IC-package may well exceed the desired positional tolerance for the LED packaged inside, it may be impossible for the robot to position surface mount LEDs with the desired accuracy. However, without the obscuring presence of an IC-package a pick-and-place robot may determine the precise location of a bare die, and position it accordingly. Compared to for example the use of a monolithic array, dicing the wafer allows for very efficient use of wafer material and thus contributes to an economical production process. Doing away with the IC-package also means disposing of a thermally insulating barrier between the actual LED and the support body to which the LED is thermally coupled. The operational temperature of the LED may therefore be lower, which is beneficial to its life span and light output.

According to an aspect of the invention, the levelling surface is provided by a substantially rigid support body that comprises at least a first layer, which layer provides the levelling surface, and which layer comprises a material having a thermal conductivity of at least 150 W/mK.

It is a known fact that LEDs exhibit a light output sensitivity to temperature, and in fact are permanently degraded by excessive temperature. To promote the life-expectancy of an LED array, and equally important: the homogeneity of its light output, care is taken to ensure that the LEDs are not excessively and/or unevenly heated. To this end, a levelling surface to which the LEDs are thermally coupled may preferably comprise a material having a large thermal conductivity, for example >150 W/mK, such as copper or aluminium. In some embodiments, the support body may comprise multiple layers. The support body may, for example, comprise a base of Invar, topped with a relatively thin layer of copper that provides the levelling surface. The copper layer, which possesses a thermal conductivity >150 W/mK may contact the second surfaces of the LEDs, and allow the LEDs to give off their heat. The copper layer will spread the heat, and transfer it on to the base of Invar, which has a lower thermal conductivity but a more favourable (i.e. lower) thermal expansion coefficient. The base of Invar will limit changes in the relative positions of the LEDs due to even or uneven heating of the base by the LEDs. In general, any such base layer preferably has a linear thermal expansion coefficient (i.e. fractional increase in length per degree of temperature change) of $5 \cdot 10^{-6}$/K or less.

Alternatively or in addition to material choices, a substantially rigid support body may be fitted with structural characteristics that allow it suitably transfer heat. The support body may, for example, be provided with one or more cooling channels through which—during use—a cooling fluid may be circulated, and/or cooling fins capable of dissipating LED generated heat.

The above-mentioned and other features and advantages of the invention will be more fully understood from the following detailed description of certain embodiments of the invention, taken together with the accompanying drawings that are meant to illustrate and not to limit the invention.

Figure 1:
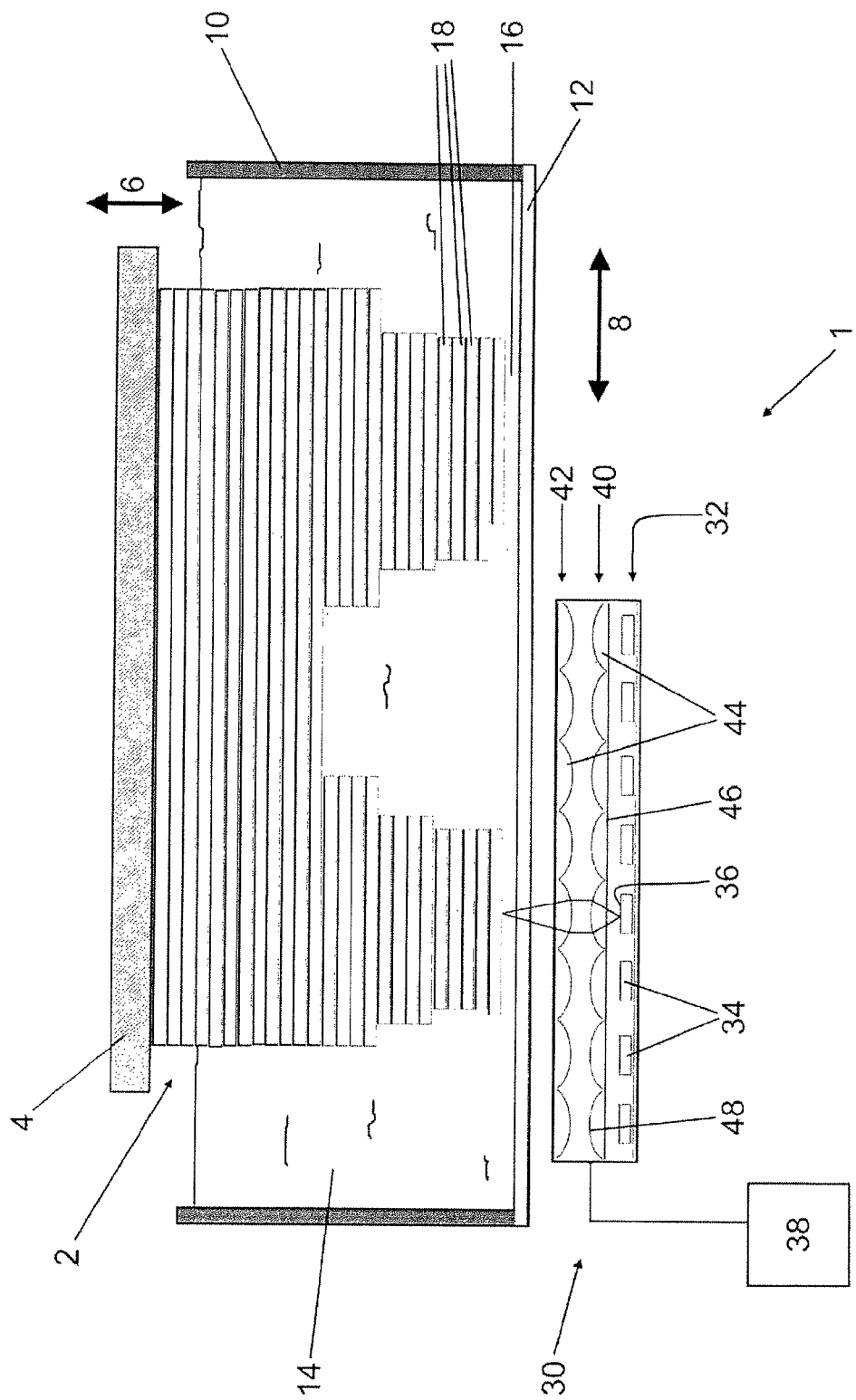
FIG. 1 is a schematic sectional view of an exemplary stereolithography apparatus in which the illumination system according to the present invention may be used.

In the drawings, identical reference numbers identify similar elements. The sizes, shapes, relative positions and angles of elements in the drawings are not necessarily drawn to scale, and some of these elements may be arbitrarily enlarged and positioned to improve drawing legibility. Further, the particular shapes of the elements as drawn are not intended to convey any information regarding the actual shape of the particular elements, and may have been solely selected for ease of recognition in the drawings.

DETAILED DESCRIPTION

Reference is first made to FIG. 1, which shows a sectional side view of an exemplary stereolithography apparatus (SLA) 1 in which the illumination system according to the present invention may be implemented. The SLA 1 may be used for the layerwise production of a tangible object 2, such as a prototype or model of an article of manufacture. The SLA 1 comprises a carrier plate 4, a liquid reservoir 10, and an illumination system 30.

During production, the tangible object 2 is suspended from the Carrier plate 4 to which the first-constructed layer of the object 2, and indirectly also any subsequent layers, adhere. The carrier plate 4 is moveable in a direction 6 by means of a drive mechanism (not shown), and is moved upward one layer thickness each time a new layer has been constructed.

The liquid reservoir 10 is filled with a liquid, photo-curable resin 14. A bottom plate 12 of the liquid reservoir 10 is optically transparent to the light emitted by the illumination system 30, which is to be described hereafter. The bottom plate 12 also functions as a construction shape that bounds one side of a liquid layer 16 to be (partially) solidified. It will be clear that once a layer has been constructed, and the carrier plate 4 is moved upward one layer thickness, the space between the lastly constructed layer and the bottom plate 12 is filled with resin 14, so as to form said liquid layer 16.

The SLA 1 also comprises an illumination system 30 that is adapted to selectively illuminate a predetermined area of the liquid layer 16. As a result of the illumination, a solid layer 18 of the tangible object 2 may be obtained, said layer 18 having a predetermined shape in accordance with the applied illumination pattern. The illumination system 30 includes an LED array 32 and an imaging system that comprises two multi-lens arrays 40, 42. In other embodiments, the imaging system may comprise a different number of multi-lens arrays, for example just one, and/or other elements, depending on the desired configuration.

At a high numerical aperture for example, a numerical aperture in the range of 0.3-0.8 or even higher then 0.8 slight changes in the position of an LED may have enlarged effects on the dimensions of its conjugate image spot. By way of example: the image spots in question may have a diameter on the order of 100 µm, whereby effective spot separation distances of 50 µm may be effected. If an LED would be positioned 10 µm from its ideal position (in a direction parallel to the optical axis of the optical system), this deviation might cause an increase in image spot diameter of about 30 µm. Obviously, this is a significant and in fact unacceptable aberration. Deviations of the LEDs from their ideal positions in directions perpendicular to the optical axis of the optical system may not be enlarged, but merely passed on to the image. Still, when aiming for an effective spot separation distance of 50 µm or less, deviations of 10 µm may seriously impair the resolution of the system.

Thus, the desire to use an optical system having a high numerical aperture translates, inter alia, into relative positioning tolerances for the LEDs. As illustrated, the presently desired positional tolerances for the LEDs are less than 10 µm in each of the x, y and z directions, wherein the x-y plane is the plane of the two-dimensional LED array and the z-direction extends in a direction perpendicular thereto. Such precise positioning seems unattainable using common surface mount LEDs mounted on (multi layered) printed circuit boards. The dimensional tolerances of the LEDs may easily exceed the above-mentioned 10 µm, disabling a pick-and-place robot to position them with the desired accuracy, while multi-layer printed circuit boards—which provide for the electrical connections to each individual LED—are difficult to flatten, in particular across the relatively large surface areas required by LED arrays. In contrast, a monolithic array of LEDs, i.e. a complete wafer (section) comprising a plurality of LEDs, offers an alternative that excels in positional accuracy of the individual LEDs. This is because the wafer manufacturing process itself warrants the exactitude. However, when the desired separation distance between neighbouring LEDs in the array increases, more precious wafer material is essentially wasted. At typical separation distances of about 1 mm and more, the costs of using of a monolithic array become unacceptably high.

Though positional accuracy of the LEDs is a principle problem in itself, additional design requirements must be met as well. These requirements include the individual controllability of each LED, which requires individual electrical pathways to each LED, and a good thermal management system that prevents fast and/or uneven degradation of the LEDs due to their unfavourable sensitivity to high temperatures.

The LED array 32 comprises a plurality of LEDs 34. The LEDs 34 are arranged in a two-dimensional plane, preferably in a grid-like fashion, such that the LEDs compose equidistant and perpendicularly oriented rows and columns with each LED defining a gridpoint. Each of the LEDs 34 possesses a light-emitting surface 36 that faces the bottom plate 12 of the liquid reservoir 10, which is substantially parallel to the two-dimensional plane of the LED array 32. A controller 38 may be provided to control, i.e. switch off and on (with desired intensity), individual LEDs 34 in the array 32 so as to create a time-varying two-dimensional pattern of lighted LEDs that may be projected onto the liquid resin layer 16.

The substantially planar multi-lens arrays 40,42 are disposed in between the light-emitting surfaces 36 of the LEDs 34 and the liquid layer 16 to be selectively cured. Each of the arrays 40, 42 comprises a plurality of lenses 44, preferably one for each LED 34. The lenses 44 may preferably be arranged in correspondence with the arrangement of the LEDs 34 in the array 32. The multi-lens arrays 40, 42 may be of the plano-convex type, thus having one plano side 46 that defines the plano side of all lenses 44, and a plurality of convex, partially spheroidally shaped sections 48, one for each lens 42. The multi-lens arrays 40, 42 may be oppositely oriented, as shown in FIG. 1. Together, the multi-lens arrays 40, 42 form an imaging system that is adapted to image a pattern of lighted LEDs onto the liquid layer 16 in such a way, that each lighted LED 34 produces a separate, conjugate spot on a predetermined area of the liquid layer 16. The multi-lens arrays 40, 42 may be made of a variety of materials, including glass, fused silica and plastic.

The illumination system 30 may be moveably disposed below the bottom plate 12 of the liquid reservoir 10, such that it can move in a direction 8 parallel to the bottom plate 12 of the liquid reservoir 10. The motion of the illumination system 30 may be controlled by the aforementioned controller 38, which also controls the lighting of the LEDs 34. In use, the illumination system 30 may be moved rectilinearly in a direction that extends at an angle with the directions of the rows and columns of the LED array 32 to enhance the effective resolution of the system. This technique is described in more detail in copending application EP 07150447.6 in the name of applicant, which is incorporated herein by reference for further information regarding this aspect.

Figure 2:
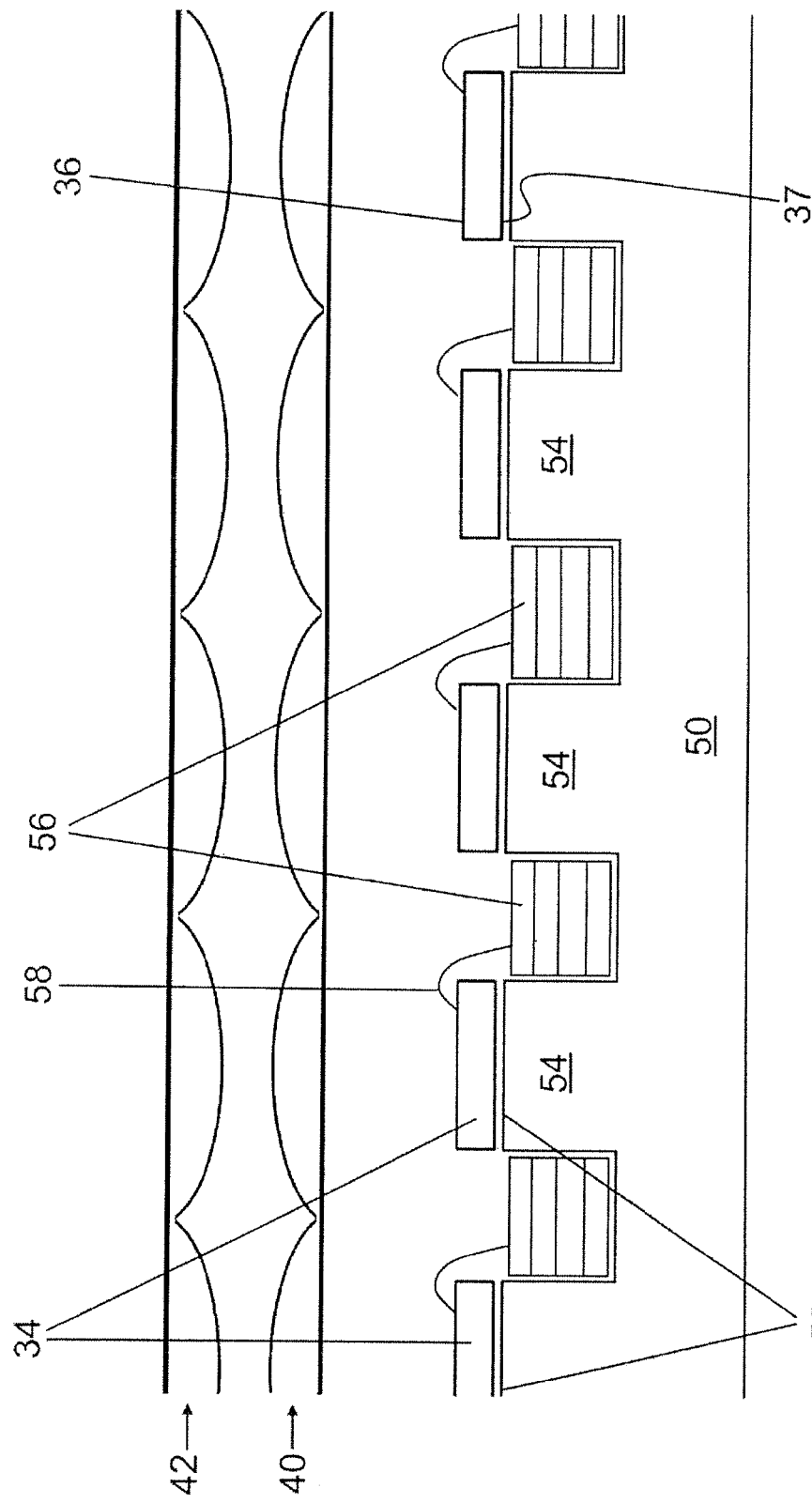
FIGS. 2-4 schematically illustrate certain embodiments of an illumination system according to the present invention.
Figure 3:
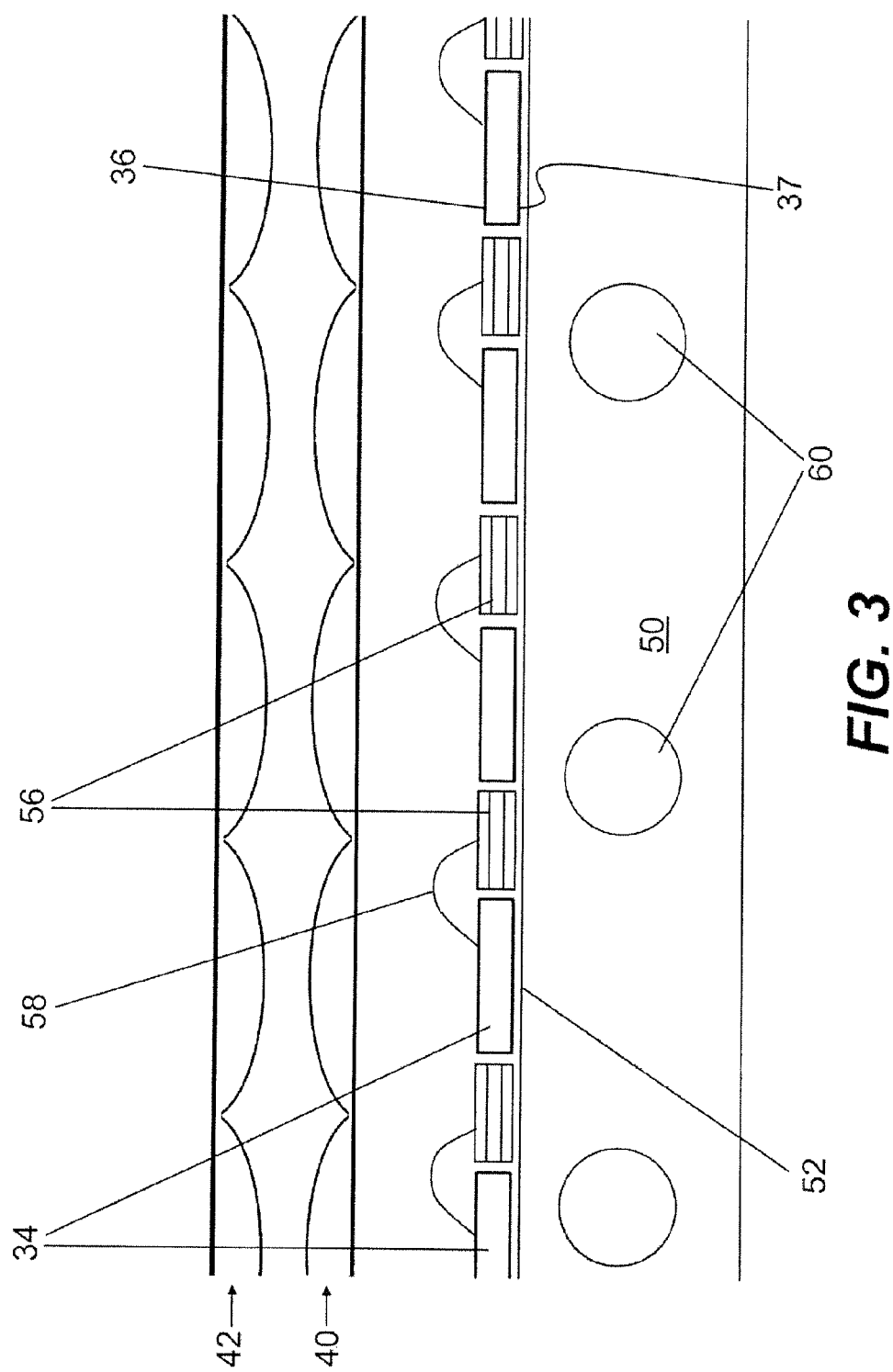
Figure 4:
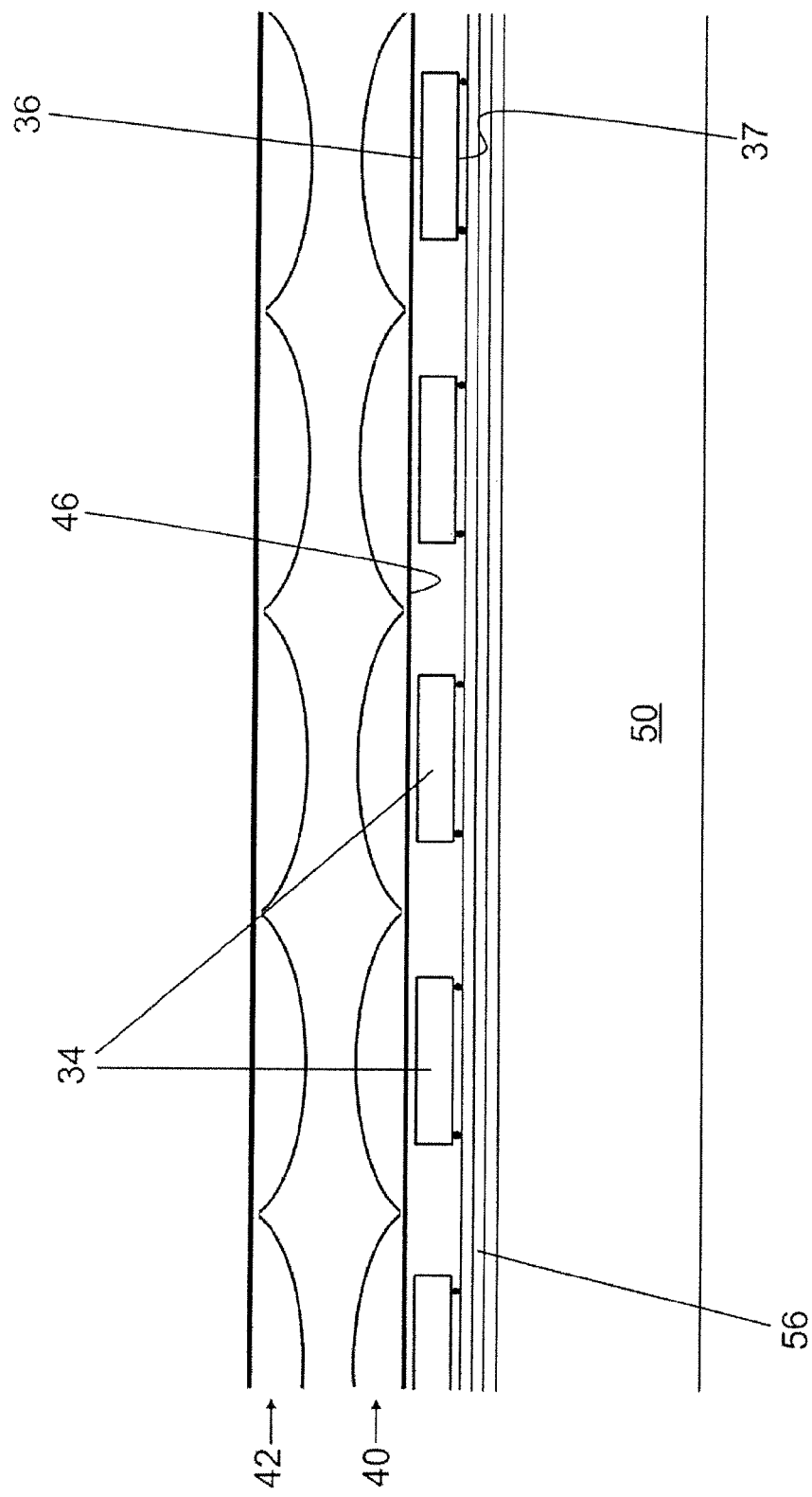

Now that the operational context of the illumination system 30 has been clarified, attention is invited to FIG. 2-4, which schematically show certain embodiments thereof in more detail.

FIG. 2 is a schematic sectional view of an embodiment of an illumination system 30 according to the present invention. In addition to the LEDs 34 and the multi-lens arrays 40, 42 already shown in FIG. 1, FIG. 2 depicts a support body 50 and electrical pathways 56.

The LEDs 34, which in the embodiment of FIG. 2 are bare dies, are in mechanical and thermal contact with the support body 50 through their second surfaces 37. The support body 50, which may be a plate or otherwise suitably shaped body, may be partially made of material having a large thermal conductivity, e.g. >150 W/mK, such as aluminium or copper. Good thermal conductivity allows the support body to serve as a heat sink, and to divert excessive heat away from the LEDs 34 in order to increase their life-expectancy and to prevent degradation of their light output. It may also prevent mutually uneven heating of the LEDs 34, which might lead to uneven light-production across the array 32. During manufacture, the top surface of the support body is polished, for example optically, to obtain a smooth and substantially flat levelling surface 52. The surface flatness of the polished levelling surface 52 may be less than 10 µm, and preferably less than 5 µm. After the polishing treatment, slots may be machined into the upper side of support body 50. In the embodiment of FIG. 2, the slots accommodate the electrical pathways 56, whereas the ribs 54 between them provide for mechanical support of the LEDs 34. Due to the method of construction, the ribs 54 have substantially flat top surfaces 52 that all extend in the same plane. Together, they may therefore be considered a 'levelling surface' in the meaning of this text. The substantially flat second surfaces 37 of the LEDs 34 may be attached to the levelling surface 52 by means of a thin layer of adhesive. The adhesive may preferably be thermally conductive. If desired, the adhesive may also contain spacers, such as glass or polystyrene spheres, to help set the exact distance between the levelling surface 52 and the second surfaces 37 of the LEDs 34. An exact separation distance not only contributes to the positional accuracy of the LEDs 34, but also precisely defines the bond layer thickness between the LEDs and the levelling surface 52. As the thickness of the bond layer is approximately proportional to the thermal resistance of the layer, constancy of the bond layer thickness for all LEDs 34 in the array is a feature that counteracts their uneven heating and degradation.

The electrical pathways 56 may be provided for in the form of multi-layered printed-circuit board (PCB). Multi-layered PCBs allow for a high density of electrical pathways 56, which is a practical requirement due to the relatively compact packing of the LEDs 34. Every 1-2 mm$^2$ of levelling surface 52, for example, may typically be provided with an LED 34, while an illumination system 30 may comprise many thousands of individually controllable LEDs altogether. As mentioned, the electrical pathways 56 are, at least partly, disposed in the slots between the ribs 54. This configuration prevents the pathways 56 from forming an obstruction to light that is radiated by the LEDs 34 towards the multi lens array 40. The electrical connections of the LEDs 34 to the electrical pathways 56 may be effected through wire bonds 58, which may selectively connect the electrical contact pads of the bare die LEDs to the electrical pathways 56.

FIG. 3 shows a second, alternative embodiment of the illumination system 30. In this embodiment, a ceramic support body 50 having a high thermal conductivity is used. To further promote the discharge of heat, the support body 50 may additionally be fitted with one of more channels 60 through which a cooling fluid may be circulated. In contrast to the embodiment of FIG. 2, the ceramic support body 50 shown in FIG. 3 has a single, continuous levelling surface 52. This levelling surface 52 has been polished to obtain the desired degree of surface flatness. No slots are machined into the support body 50 during manufacture to accommodate the electrical pathways 56. Instead, the electrical pathways 56 are provided for by thick film layers that may be applied to the levelling surface 52 by means of, for example, screen printing. The schematically depicted stacks of layers shown in FIG. 3 may be made up of alternately conductive and non-conductive layers. Wire bonds 58 may be used to selective connect the electrical contact pads of the bare die LEDs 34 to the respective conductive layers. As in the embodiment of FIG. 2, the LEDs 34 may be attached to the levelling surface 52 by means of a preferably thermally conductive adhesive, comprising spacers or not.

In the embodiments of FIGS. 2 and 3, the support body 50 provides for mechanical support and the thermal cooling of the LEDs 34. The supply of electrical power is taken care of by the electrical pathways 56. This situation is to be distinguished from a more traditional setup wherein surface mount LEDs are simply placed onto a PCB, which PCB is to fulfil all three functions. Such a setup does not allow for accurate positioning of the LEDs, in particular because multi-layered PCB usually have an unacceptably large z-tolerance.

FIG. 4 shows an embodiment wherein the LEDs 34 are nevertheless positioned on a multi-layered PCB, which itself is provided on the upper surface of a support body 50. The accurate z-alignment of the LEDs 34, however, is not accomplished by means of the PCB, but by means of attachment of the LEDs 34 to the plano side 46 of the multi-lens array 40, which side 46 serves as a levelling surface. To allow for such a configuration, the employed LEDs 34 are preferably so-called (bare die) flip-chips. Their light-emitting surfaces 36 are free of electrical contact pads, and therefore substantially flat. In one embodiment, the light-emitting surfaces 36 of the flip-chip LEDs 34 may be adhered to the substantially flat plano side 46 of the multi-lens array 40 using an optically transparent adhesive, so as to obtain proper z-alignment. During manufacture, the LEDs 34 may first be attached to the plano side 46 of the multi-lens array 40, and then—after any adhesive has set and the relative positions of the LEDs 34 are fixed—be connected to the electrical pathways 56 of the PCB, e.g. using ultrasound soldering or an anisotropic conductive adhesive. In an alternative embodiment, the LEDs may not be glued to the multi-lens array. They may, for example, first be connected to the electrical pathways 56 of the PCB, whereby a flexible adhesive may be provided between the second surfaces 37 of the LEDs 34 and the top surface of the PCB. Subsequently, the multi-lens array 40 may be put in place, such that its plano side 46 presses gently against the light-emitting surfaces 36 of the LEDs 34 to align them in the z-direction. When all LEDs 34 are properly aligned, the flexible adhesive may be cured to permanently fix the relative orientations of the LEDs. An advantage of the first embodiment is that the LEDs 34 are fixed to the multi-lens array 40 with high positional accuracy. Accordingly, no separate alignment of the LEDs 34 and the multi-lens array 40 is necessary, and differences in thermal expansion coefficients between the multi-lens array on the one hand, and the support body and/or the PCB on the other, can no longer cause misalignment of the LEDs relative to the multi-lens array.

Figure 5A:
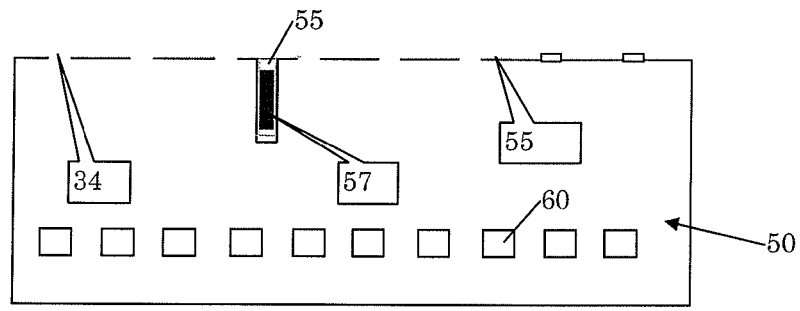
FIGS. 5A and 5B show a schematic side view and a perspective view of a further embodiment.
Figure 5B:
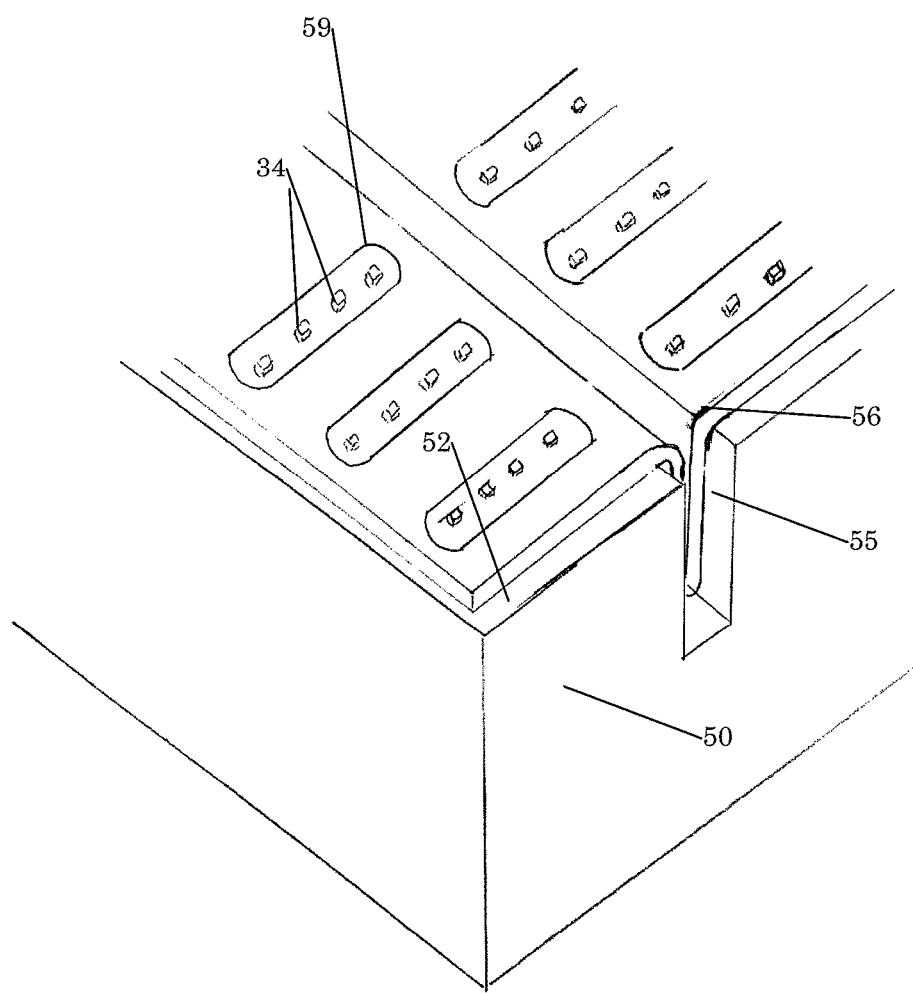

FIGS. 5A and 5B show a schematic side view and a perspective view respectively, of a further embodiment having slots 55 accommodating PCB 56, whereas the ribs 54 between the slots 55 provide for mechanical support of the LEDs 34. It is shown that multiple LEDS 34 may be provided on the surface 52; which are groupwise controlled by electrical circuitry arranged on the PCB 56 in the slots 55. This provides a thermal benefit as the LEDs are not each positioned on narrow ribs dimensioned to the LED interdistance, which could otherwise limit thermal conductivity to the cooling channels 60.

The electrical pathway structures 56 on PCB may be stacked in a vertical configuration, that is, the PCB extending in a plane transverse to the levelling surface 52. This optimizes the gap distance which can be kept minimal between subsequent LEDs 34.

In this way, by using slot 55 to expand a planar region of the PCB, a mere single or two -layer PCB structure is sufficient to provide all the electronic pathways from the LEDs to the ICs 57.

In addition by arranging a driver circuit 57 in the slot 55, a distance between driver ICs 57 and LEDs can be shortened. The illustrated PCB structure 56 extends in addition, in the preferred embodiment in the plane of the levelling surface 56, and has openings 59 to accommodate LEDs 34 that are directly provided on the levelling surface.

The openings are made substantially larger than the size of the LEDs, such that the tolerance on the position of the PCB with respect to the LEDs is high. The PCB 56 is a flex type PCB and is folded such that at least the part with ICs 57 fits in the slots 55 and the part with the holes for the LEDs lies flat on the substrate 50.

Although illustrative embodiments of the present invention have been described with reference to the accompanying drawings, it is to be understood that the invention is not limited to these embodiments. Various changes or modifications may be effected by one skilled in the art without departing from the scope or the spirit of the invention as defined in the claims. Furthermore, it is noted that application of the illumination system described above is not limited to the field of stereolithography. It may, for example, also be applied in other fields of the printing industry.

LIST OF ELEMENTS

1 Stereolithography apparatus (SLA)
2 Tangible object
4 Carrier plate
6 Direction of movement of carrier plate
8 Direction of movement of illumination system
10 Liquid reservoir
12 Bottom plate of liquid reservoir
14 Photo-curable resin
16 Liquid layer
18 Solid layer of tangible object 2
30 Illumination system
32 LED array
34 LED
36 Light-emitting surface of LED
38 Controller
40 Multi-lens array
42 Multi-lens array
44 Lens
46 Plano side of lens
48 Convex side of lens
50 Support body
52 Support body surface
54 Rib
56 Electrical pathways
58 Wire bond
60 Cooling channels

The invention claimed is:
1. An illumination system, comprising:
a plurality of light-emitting diodes (LEDs), each LED having at least a first, light-emitting surface and a second surface, at least one of the first and the second surface being substantially flat;
a plurality of electrical pathways, selectively connected to the respective LEDs, such that each LED can be individually controlled; and
a leveling surface,
wherein the leveling surface is substantially flat and in leveling contact with the at least one substantially flat surface of each LED, such that a two-dimensional array of LEDs extends in a plane parallel to the leveling surface,
wherein the leveling surface is provided by a substantially rigid support body, wherein a surface of the support body is provided with slots, defined by intermediate ribs comprising flat top surfaces, in which the electrical pathways are at least partially embedded in the slots, wherein the leveling surface is provided by the flat top surfaces of the intermediate ribs, the flat top surfaces being free of said electrical pathways, and the LEDs are disposed with the at least one substantially flat surface on the flat top surfaces such as to be in mechanical and thermal contact with the support body.

2. The illumination system according to claim 1, wherein the leveling surface has a surface flatness of at least 10 µm.

3. The illumination system according to claim 1, wherein the leveling surface has a surface flatness of at least 5 µm.

4. The illumination system according to claim 1, wherein the LEDs are bare dies.

5. The illumination system according to claim 1, wherein the at least one substantially flat surface of each LED is connected to the leveling surface by an adhesive.

6. The illumination system according to claim 5, wherein the adhesive comprises spacers, the spacers comprising spheres of glass or polystyrene.

7. The illumination system according to claim 1, wherein the support body comprises at least a first layer, the first layer comprising a material having a thermal conductivity of at least 150 W/mK and wherein the first layer provides the leveling surface.

8. The illumination system according to claim 7, wherein the support body further comprises a second layer, the second layer comprising a material having a linear thermal expansion coefficient of $5 \cdot 10^{-6}$/K or less.

9. The illumination system according to claim 1, wherein both the LEDs and the electrical pathways are provided on the leveling surface, such that the electrical pathways extend at least partially between the LEDs.

10. The illumination system according to claim 7, wherein the electrical pathways are provided by means of thick film technology.

11. The illumination system according to claim 1, wherein the electrical pathways are provided for in the form of printed circuit board.

12. The illumination system according to claim 1, wherein the LEDs are of the flip-chip type, having substantially flat light-emitting surfaces and having their electrical connections on their respective second surfaces, and wherein a plano side of a multi-lens array provides for the leveling surface, such that the light-emitting surfaces of the LEDs are in leveling contact with the plano side of the multi-lens array.

13. The illumination system according to claim 12, wherein the electrical pathways, to which the LEDs are connected at their second surfaces, are at least partially provided for in the form of printed circuit board.

14. The illumination system according to claim 12, wherein the lenses of the multi-lens array are arranged in correspondence with the arrangement of the LEDs, such that the light-emitting surface of each LED is primarily associated with one lens of the multi-lens array.

15. A stereolithography apparatus comprising an illumination system according to claim 1.

* * * * *